United States Patent [19]

Gobran

[11] 3,927,239

[45] Dec. 16, 1975

[54] FLEXIBLE STRIP COATED WITH A PRESSURE-SENSITIVE ADHESIVE COMPOSITION TACKIFIED WITH PHENOL-DIENE-PHENOL RESIN ADDUCT

[75] Inventor: Ramsis Gobran, Roseville, Minn.

[73] Assignee: Minnesota Mining and Manufacturing Company, St. Paul, Minn.

[22] Filed: Oct. 23, 1973

[21] Appl. No.: 408,590

[52] U.S. Cl. ......... 428/355; 260/619 B; 260/619 D; 260/728; 427/207; 428/492; 428/500; 428/524; 428/496; 428/509

[51] Int. Cl.² .......................................... C09J 7/02

[58] Field of Search ............ 117/76 A, 68.5, 122 P, 117/122 PF, 122 PA, 122 PB, 161 A; 260/617, 618, 619 B, 619 D, 728; 428/355, 492, 500, 524; 427/207

[56] References Cited
UNITED STATES PATENTS

| | | | |
|---|---|---|---|
| 2,333,730 | 11/1943 | Mitchell | 117/161 X |
| 2,345,597 | 4/1944 | Harmon | 117/161 X |
| 2,471,454 | 5/1949 | Rummelsburg | 260/631.5 X |
| 2,864,868 | 12/1958 | Bader | 260/619 X |
| 3,067,057 | 12/1962 | Dabroski | 117/122 X |
| 3,231,419 | 1/1966 | Korpman | 117/122 |
| 3,336,398 | 8/1967 | Booth | 260/619 |
| 3,383,362 | 5/1968 | Gonzenbach | 260/897 X |
| 3,413,246 | 11/1968 | Weymann et al. | 117/122 |
| 3,554,940 | 1/1971 | Arakawa et al. | 117/122 X |
| 3,681,190 | 8/1972 | Dahlquist | 117/122 X |

*Primary Examiner*—Bernard D. Pianalto
*Attorney, Agent, or Firm*—Alexander, Sell, Steldt and DeLaHunt

[57] ABSTRACT

A pressure-sensitive adhesive article comprising a flexible strip having a pressure-sensitive adhesive coating comprising cis polybutadiene or natural rubber tackified with a phenol-diene-phenol adduct prepared by reacting one mole of a non-conjugated diene with two moles of a phenolic compound in the presence of a Friedel-Crafts catalyst.

4 Claims, No Drawings

FLEXIBLE STRIP COATED WITH A PRESSURE-SENSITIVE ADHESIVE COMPOSITION TACKIFIED WITH PHENOL-DIENE-PHENOL RESIN ADDUCT

BACKGROUND OF THE INVENTION

The present invention relates to the reaction product of phenolic compounds and non-conjugated dienes. In another aspect, the invention relates to adhesive compositions tackified with such products and articles coated with such adhesive compositions.

It has been the general practice in the manufacture of adhesives from elastomeric materials, such as natural rubber, polyisoprene, cis-butadiene, styrene-butadiene rubbers, ethylene-propylene rubbers, and the like, to mix with the elastomers a tackifying agent sometimes merely called a tackifier. The tackifying agent is added to the elastomer to enable the normally weakly tacky or non-tacky elastomers to become tacky, i.e., to be capable of adhering to a surface with the application of very little or no pressure.

For the most part the tackifiers for elastomers are rosin, modified rosins, polyterpene resins and courmarone-indene resins. Other resins of importance are the reaction products of alkylphenols with acetylene and the reaction products of phenols with aldehydes. Of particular importance in the manufacture of adhesives from natural and synthetic rubbers has been the terpene resins. The resins prepared from β-pinene have been especially important in the manufacture of adhesives. The use of β-pinene in the manufacture of tackifiers for adhesives, however, has become restricted because of its limited supply and because of the growing use of β-pinene in other fields. Terpenes therefore have been extended for use as tackifiers by reaction with phenols.

U.S. Pat. No. 3,383,362 discloses reacting phenols with cyclic polyolefin and terpene, sesquiterpene, dihydroterpene or a low molecular weight propylene polymer to produce tackifiers. Such tackifiers, however, require large amounts of the expensive terpenes. Tackifiers from rosin, modified rosins, coumarone-indene resins and phenol condensation products with acetylene and aldehydes, furthermore have not adequately provided replacement for polyterpene resins because they have a variety of deficiencies. For example, some fail to produce a sufficiently high degree of tack, others are too expensive, and still others are chemically unstable.

Low molecular weight reaction products of phenols and dienes are known but not in forms which are suited for use as tackifiers. U.S. Pat. No. 3,336,398, for example, discloses the reaction of phenols with a diene, i.e., dicyclopentadiene, at temperatures which converts the dicyclopentadiene to a conjugated cyclodiene, producing a product having ethylenic unsaturation. Such unsaturated materials are not chemically stable. U.S. Pat. No. 2,471,454 teaches dihydroterpene-substituted phenol compounds rather than diene-substituted phenols, requiring expensive terpenes as a starting material. U.S. Pat. No. 2,864,868 discloses the reaction product of conjugated dienes with phenols to produce hard, dark resinous products having blocks of polymerized diene and also having ethylenic unsaturation. As well as being chemically unstable, such products are not compatible with some elastomers.

Summary of the Present Invention

The present invention provides a novel phenol/diene compound that is especially useful as a tackifier for rubbery polymers in adhesive compositions. The compound is produced by reacting certain phenolic compounds with non-conjugated dienes in the presence of a Friedel-Crafts catalyst. The resultant compound is a ternary adduct of 2 moles of a phenolic compound and 1 mole of a diene. It has been discovered that such ternary adducts blend quite unexpectedly well with natural rubber, and when so blended impart a high degree of adhesive tack thereto. The ternary adducts of the invention find particular use as specialty tackifiers, imparting a high degree of tack to rubbery materials such as natural rubber and being capable of modifying its consistency to provide adhesive compositions which may vary from highly cohesive to weakly cohesive, depending upon the amount of adduct used. These adhesives, therefore, are useful for adhering temporary labels to various objects, and for many other applications.

The non-conjugated dienes used in the reaction to produce the compounds of the invention are organic compounds characterized by having at least two loci of unsaturation, e.g., two double bonds, that are separated by a saturated moiety which effectively prevents conjugation. Suitable dienes of this type include dicyclopentadiene, 4-vinylcyclohexene-1, dipentene, 1,5-cyclooctadiene, etc. For the purposes of the present invention, the term "non-conjugated dienes" also encompasses trienes which will have, as specified above, at least two loci of unsaturation that are separated by a saturated moiety which effectively prevents conjugation. A triene which is useful in the present invention is 1,5,9-cyclododecatriene.

The phenolic compound is a substituted phenol having only one ring carbon atom which is susceptible to alkylation. Phenolic compounds suitable for the reaction and having only one ring carbon atoms susceptible of alkylation include di-o-alkyl phenols, o,p-dialkyl phenols, o,p,m-trialkyl phenols, and o,o,m,m-tetra substituted phenols.

The reaction is carried out in the presence of a Friedel-Crafts catalyst such as an acid, e.g., hydro-fluoric acid, sulfuric acid, or phosphoric acid, or a Lewis acid such as aluminum chloride, aluminum bromide, boron trifluoride, boron trifluoride ether and acid complexes, beryllium chloride, ferric chloride, zinc chloride, etc. Boron trifluoride and the ether and acid complexes thereof are the preferred catalysts.

The amount of catalyst required, functionally stated, is that amount sufficient to cause the reaction to go to completion producing the ternary adduct. This amount will generally be about 1–3% of the weight of the reactants exclusive of the weight of the catalyst.

In the reaction, 2 moles of phenolic compound should be employed for each mole of diene. At less than 2 moles of phenolic compound per mole of diene, products are produced which are ethylenically unsaturated and thus are susceptible to reaction with atmospheric oxygen, causing the product to become hard and brittle thus useless as an adhesive tackifier and when blended with a polymer for that purpose, causes the adhesive to become non-tacky. No more than 2 moles of phenolic compound will react with 1 mole of diene, therefore excess phenolic compound should be avoided or removed from the reaction mixture.

It has been found that the order of adding the reactants is important to produce the desired product. The phenolic compound should always be in an excess during the reaction, else homopolymerization of the diene results rather than the production of a ternary adduct. An excess of phenolic compound can be maintained by charging the reaction vessel therewith, adding the catalyst, and then slowly adding the diene with sufficient agitation to cause rapid dispersal.

The reaction can be carried out at atmospheric pressure but care should be taken to substantially exclude moisture, e.g., by purging the reaction vessel with a dry inert gas. The preferred reaction atmosphere is dry argon or nitrogen.

For convenience in handling and reaction control, the reactants may be mixed with an inert liquid reaction medium at about 10 to 40 parts by weight reactants per 100 parts total (reaction medium plus reactants), preferably about 15 to 30 per 100. The preferred reaction medium is also a solvent for at least one of the reactants. Exemplary reaction media include aromatic hydrocarbons such as toluene and xylene, aliphatic hydrocarbons such as heptane and hexane, and halogenated hydrocarbons such as chlorobenzene and dichlorobenzene.

The reaction temperature is maintained preferably between room temperature (about 20°C.) and 130°C. although slightly higher and slightly lower temperatures may also be effective. At temperatures above about 135°C. chemical modification of some dienes will occur, causing them, in some cases, to convert to conjugated dienes; therefore, temperatures substantially above 135°C. should be avoided where appropriate.

The most convenient method of accomplishing the reaction is to charge the phenolic compound, the reaction medium (if used) and the catalyst into a suitable reaction vessel — and, with mixing, dropwise add the diene. The reaction will be exothermic and care should be taken to maintain the reaction mixture at a temperature of less than about 130°C. Such a result can easily be accomplished by very slow addition of the diene or by cooling the reaction vessel contents. After the addition of the diene is completed, heating at about 130°C. and agitation are continued until the reaction is complete. Reaction completion is generally achieved within 2 to 4 hours.

Once the reaction is complete, the product can be isolated, for example, by distillation of the catalyst, reaction medium (if used), unreacted materials, and low molecular weight products. Non-volatile catalysts or residues can be removed by known methods in the art, e.g., extraction, or they may be left in the product, if they are inert (or can be rendered inert) with respect to the materials with which they will be eventually used.

The ternary adduct is generally a friable light amber resin which has a molecular weight of at least about 400. The molecular weight varies from about 400 to about 800 or higher depending, of course, on the molecular weight of the starting materials.

The ternary adduct of the invention can be used as prepared to tackify rubbers such as natural rubber. The ternary adduct of the invention is blended into the rubber by using conventional rubber compounding equipment and techniques, generally at about 5 to 200 parts by weight ternary adduct per 100 parts rubber, preferably 40 to 100 parts adduct per 100 parts rubber.

It has also been discovered that when the ternary adduct is partially or fully hydrogenated, the hydrogenated product thereof will also provide a useful tackifier. In the partially hydrogenated products, at least half, but not substantially all, of the hydrogenatable carbon atoms are hydrogenated. The hydrogenatable carbon atoms are the olefinic carbon atoms (from the phenol groups) and the carbon atoms bearing hydroxyl groups. Preferably from about 50 to 60 percent of the hydrogenatable carbon atoms are hydrogenated in the partially hydrogenated products.

Hydrogenation can be achieved by reacting the ternary adduct, in a suitable hydrogenation reaction medium (if desired) in a hydrogen atmosphere in a suitable pressure-resistant vessel in the presence of a suitable hydrogenation catalyst. The hydrogenation temperature can vary between about 50°C. and 275°C., although temperatures in the range of 100°C. to about 250°C. are preferred. A hydrogen gas pressure of from about 500 to about 4000 psig (preferably 1000 to 2500) will produce an adequate rate of hydrogenation.

The hydrogenation reaction vessel should be capable of withstanding the hydrogenation temperature and pressure and is constructed of a material that is non-reactive with the starting materials and product. Such vessels are generally made of stainless steel. The vessel should be fitted with a stirrer to agitate the reactants, a temperature sensing device to observe the hydrogenation reaction temperature, an inlet line with a valve to introduce hydrogen into the vessel, an exhaust line with a valve to vent the vessel after the hydrogenation reaction is completed, and a pressure-sensing device to observe the hydrogen pressure.

Hydrogenation is achieved by first purging the hydrogenation vessel with a dry inert gas such as dry nitrogen and then charging it with the ternary adduct, reaction medium, and catalyst, sealing the vessel, commencing stirring, pressurizing the vessel with hydrogen, heating to the appropriate temperature, and continuing to heat (and to stir) the vessel until the reaction is complete. The time required is generally about 2 to 24 hours but this may vary. Partial hydrogenation may be achieved at shorter hydrogenation times (e.g., 0.1 to 3 hours) while substantially complete hydrogenation requires longer reaction times (e.g., 2 to 24 hours).

Useful hydrogenation reaction media includes saturated hydrocarbon liquids such as cyclohexane, heptane, etc. The weight ratio of reaction medium to ternary adduct plus catalyst will generally be from about 1:1 to about 10:1 or higher.

The preferred hydrogenation catalyst is Raney nickel although others (e.g., platinum, ruthenium, nickel complexes with aluminum, e.g., nickel 2-ethyl hexanoate/diethyl aluminum reaction product and amines, etc.) may also be useful.

The tackified adhesive compositions may be coated upon flexible self-supporting strips in thin layers to provide articles of manufacture. Suitable strips are cellulose acetate or polyester films.

Understanding of the invention will be further facilitated by referring to the subsequent examples, which indicate, without thereby limiting, ways in which the invention may be practiced.

Example 1

Into a 3-liter flask fitted with a condenser, a mechanical stirrer, a dropping funnel, and a thermometer was charged 966.5g (4.7 moles) of 2,6-di(t-butyl)phenol.

After first heating the phenol to 110°C., 8.9 ml. of $BF_3$ $(CH_3COOH)_2$ was added in one lot thereto with stirring. Then, 310g (2.54 moles) of dicyclopentadiene was added dropwise over a period of 30 minutes, producing an exotherm which was maintained at about 135°C. Stirring was continued and the 130°–135°C. temperature maintained for an additional 4⅔ hours. Thereafter the flask was fitted with a vacuum distillation column and the unreacted starting material and catalyst were removed by heating the flask contents at 240°C. at a pressure of 5mm. Hg, leaving in the flask 745g of a dark brown resin having a 34°C. $T_g$, 680 $\overline{M}_w$, 530 $\overline{M}_n$, and 1.28 $\overline{M}_w/\overline{M}_n$.

("$\overline{M}_n$" denotes the number molecular weight; "$\overline{M}_w$" denotes the weight average molecular weight; and "$T_g$" denotes the glass transition temperature. $\overline{M}_w$ and $\overline{M}_n$ are determined by gel permeation chromatography utilizing a "Waters Associates Inc."Gel Permeation Chromatograph. $T_g$ is determined by differential thermal analysis utilizing an "E.I. duPont de Nemours Co." differential thermal analysis (DTA) device by the method described by Maurer in *Rubber Chem. and Tech.* v. 42, No. 1, (1969), the chapter entitled "Applications of Differential Thermal Analysis and Thermogravimetric Analysis to Elastomer Systems".)

Example 2

A hydrogenated resin according to the invention was prepared by dissolving the resin prepared according to Example 1 at about 20% solids in heptane, charging the solution into a stainless steel hydrogenation reaction vessel fitted with a thermocouple, pressure gauge, stirrer, hydrogen inlet, and exhaust valve, adding Raney nickel catalyst (0.1 gram per gram of resin) sealing the vessel, and pressurizing with about 2,000–3,100 psi of hydrogen gas. Thereafter, the reaction vessel was heated to 260°C., with stirring, for approximately 10 hours, producing about 98% hydrogenation. The hydrogenated product had a weight average molecular weight of 760, number average molecular weight of 430, glass transition temperature of 4°C. and melting point of 30°C.

The resins of Examples 1 and 2 were evaluated as tackifiers in pressure-sensitive adhesive compositions for adhesive coated tapes by dissolving the resin in a solvent such as heptane and then dissolving a rubber base material in the resin solution to form a homogeneous blend, forming approximately a 20% solids solution therein, and coating the solution on 2 mil polyester film to provide a dried coating thickness of 2 mils. Thereafter, the coated film was examined and subjective evaluation of film appearance, quality of film and tack were determined.

In an adhesive coated transparent tape, it is desired to have a clear rather than a hazy film appearance. Likewise, the film should not be cracked or show other signs of discontinuity. Additionally, the pressure-sensitive adhesive should be tacky without being unduly soft.

The term "tacky" relates to the degree of tack noted when a hand-held 1.6 mm diameter stainless steel probe was tacked to the surface of a 4 by 6 inch by 1 mil adhesive layer on a 1 mil polyester sheet, as the probe is withdrawn. "Tacky" means the entire sheet was lifted and remained on the end of the probe. (Comparison with tack measurements determined by ASTM Method D2979-71 reveals adhesives found to be tacky by the above-described test have withdrawal force values from 35 to 110 grams.)

The subjective evaluations of the pressure-sensitive adhesives are shown in the Table below.

TABLE

| Ex. | Rubber Base Material | Resin Ex.No. | Amount of Resin (as Parts Resin per 100 Parts Rubber) | Film Appearance | Quality of Film | Tack |
|---|---|---|---|---|---|---|
| 3 | natural rubber | 1 | 30 | yellow transparent | good | tacky |
| 4 | " | 1 | 40 | " | " | " |
| 5 | " | 1 | 50 | " | " | " |
| 6 | cis-polybutadiene | 1 | 30 | " | rough | " |
| 7 | " | 1 | 40 | " | good | " |
| 8 | " | 1 | 50 | " | " | " |
| 9 | natural rubber | 2 | 30 | colorless transparent | " | " |
| 10 | " | 2 | 40 | " | " | " |
| 11 | " | 2 | 50 | " | " | " |
| 12 | cis-polybutadiene | 2 | 30 | " | " | " |
| 13 | " | 2 | 40 | " | rough | " |
| 14 | " | 2 | 50 | " | " | " |

What is claimed is:

1. A pressure-sensitive adhesive article comprising a flexible self-supporting strip coated over one major surface with a thin layer of a pressure-sensitive adhesive composition comprising:
   1. 5 to 200 parts by weight of a phenol-diene-phenol adduct wherein the diene portion is essentially free of ethylenic unsaturation having a molecular weight of at least 400, said adduct being produced by reacting, in an inert atmosphere, in the presence of a Friedel-Crafts catalyst and at a temperature in the range of 20°C–135°C, 1 mole of non-conjugated diene with 2 moles of a phenolic compound having only one ring carbon atom which is susceptible to alkylation, and
   2. about 100 parts by weight cis-polybutadiene or natural rubber polymer.

2. The article of claim 1 wherein said strip is a strip of cellulose acetate.

3. A pressure-sensitive adhesive article comprising a flexible self-supporting strip coated over one major surface with a thin layer of a pressure-sensitive adhesive composition comprising:
   1. 5 to 200 parts by weight of a phenol-diene-phenol adduct wherein the diene portion is essentially free of ethylenic unsaturation having a molecular weight of at least 400, said adduct being produced by reacting at a temperature in the range of 20°C–135°C, in an inert atmosphere and in the presence of a Friedel-Crafts catalyst, 1 mole of non-conjugated diene with 2 moles of a phenolic compound having only one ring carbon atom which is susceptible to alkylation, at least half of the olefinic carbon atoms and carbon atoms bearing hydroxyl groups of said adduct being hydrogenated, and 2. about 100 parts by weight cis-polybutadiene or natural rubber polymer.

4. A pressure-sensitive adhesive article comprising a flexible self-supporting strip coated over one major surface with a thin layer of a pressure-sensitive adhesive composition comprising:
   1. 5 to 200 parts by weight of a phenol-diene-phenol adduct wherein the diene portion is essentially free of ethylenic unsaturation having a molecular weight of at least 400, produced by reacting, in an inert atmosphere, in the presence of a Friedel-Crafts catalyst and, at a temperature in the range of 20°C–135°C, 1 mole of non-conjugated diene with 2 moles of a phenolic compound having only one ring carbon atom which is susceptible to alkylation, substantially all of the olefinic carbon atoms and the carbon atoms bearing hydroxyl groups of said adduct being hydrogenated, and
   2. about 100 parts by weight cis-polybutadiene or natural rubber polymer.

\* \* \* \* \*